United States Patent
Reyes et al.

(10) Patent No.: US 12,427,412 B2
(45) Date of Patent: Sep. 30, 2025

(54) SYSTEMS AND METHODS FOR PRESENTING VISUAL CONTENT

(71) Applicant: Microsoft Technology Licensing, LLC, Redmond, WA (US)

(72) Inventors: Karlo Alexis Reyes, Woodinville, WA (US); Ryan Ashley Medlin, Portland, OR (US); Efus Richman, Seattle, WA (US); Ross Anthony Marshall, Duvall, WA (US); Raymond Charles Dean, Shoreline, WA (US); Kayla Louise Covington, Atlanta, GA (US); Brannon James Zahand, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/953,141

(22) Filed: Sep. 26, 2022

(65) Prior Publication Data

US 2024/0100428 A1    Mar. 28, 2024

(51) Int. Cl.
*A63F 13/53* (2014.01)
*G06F 3/04842* (2022.01)
*G06F 3/0485* (2022.01)

(52) U.S. Cl.
CPC .......... *A63F 13/53* (2014.09); *G06F 3/04842* (2013.01); *G06F 3/0485* (2013.01); *A63F 2300/308* (2013.01)

(58) Field of Classification Search
CPC ............... G06F 3/0485; G06F 3/04842; A63F 2300/308; A63F 13/53
See application file for complete search history.

(56) References Cited

U.S. PATENT DOCUMENTS

| | | | | |
|---|---|---|---|---|
| 6,683,626 B1* | 1/2004 | Abellera | ............... | G06F 3/0489 |
| | | | | 715/830 |
| 9,953,011 B1* | 4/2018 | Anderson | ............. | G06F 40/106 |
| 10,140,633 B1* | 11/2018 | Jaye | ................... | G06Q 30/0277 |
| 10,185,702 B1* | 1/2019 | White | ................... | G06F 40/166 |
| 11,481,872 B2* | 10/2022 | Guo | ........................... | G06T 3/40 |
| 2003/0236917 A1* | 12/2003 | Gibbs | ................. | G06F 16/9577 |
| | | | | 709/248 |
| 2005/0251742 A1* | 11/2005 | Mogilevsky | .......... | G06F 40/106 |
| | | | | 715/236 |
| 2011/0113364 A1* | 5/2011 | Neil | ....................... | G06F 3/0482 |
| | | | | 715/802 |
| 2011/0131482 A1* | 6/2011 | Shteinvil | ................. | G06F 40/58 |
| | | | | 715/229 |
| 2011/0208732 A1* | 8/2011 | Melton | ................. | G06F 16/986 |
| | | | | 707/E17.014 |

(Continued)

*Primary Examiner* — Jeremy L Stanley
(74) *Attorney, Agent, or Firm* — Ray Quinney & Nebeker P.C.; John O. Carpenter

(57) ABSTRACT

A method of navigating visual content includes establishing an interface template including a viewport; obtaining visual content data; identifying at least one focusable element in the visual content data; presenting a first portion of visual content in the viewport on a display device, wherein the visual content is based at least partially on the visual content data; indicating a first focusable element in the viewport with a visual indicator; and responsive to a user input, scrolling the visual content in the viewport when a second focusable element of the visual content is not present in the viewport in a navigation direction of the user input.

20 Claims, 5 Drawing Sheets

(56) References Cited

U.S. PATENT DOCUMENTS

| | | | |
|---|---|---|---|
| 2013/0095463 A1* | 4/2013 | Ediger | G06F 3/04847 |
| | | | 434/322 |
| 2014/0067825 A1* | 3/2014 | Oztaskent | H04N 21/64322 |
| | | | 707/E17.014 |
| 2014/0331124 A1* | 11/2014 | Downs | G06F 40/106 |
| | | | 715/243 |
| 2015/0277559 A1* | 10/2015 | Vescovi | G06F 3/017 |
| | | | 345/173 |
| 2016/0026730 A1* | 1/2016 | Hasan | G06F 16/986 |
| | | | 715/234 |
| 2016/0070434 A1* | 3/2016 | Clark | G06F 9/452 |
| | | | 715/762 |
| 2017/0102847 A1* | 4/2017 | Payzer | G06F 9/451 |
| 2017/0140063 A1* | 5/2017 | Dey | G06F 16/957 |
| 2017/0235537 A1* | 8/2017 | Liu | G06F 3/1454 |
| | | | 715/759 |
| 2017/0344218 A1* | 11/2017 | Jann | G06F 3/0483 |
| 2017/0357398 A1* | 12/2017 | Alonso-Ruiz | G06F 3/04817 |
| 2018/0052581 A1* | 2/2018 | Evans | G06F 3/04817 |
| 2018/0203706 A1* | 7/2018 | Hosenpud | H04N 13/286 |
| 2018/0300032 A1* | 10/2018 | Gil | G06F 1/1626 |
| 2019/0050378 A1* | 2/2019 | Novak | G06F 40/143 |
| 2019/0050440 A1* | 2/2019 | Novak | G06F 3/0482 |
| 2019/0081479 A1* | 3/2019 | Faley | H02J 3/381 |
| 2019/0391825 A1* | 12/2019 | Jann | G06F 3/0482 |
| 2020/0372206 A1* | 11/2020 | Fialkow | G06F 16/958 |
| 2021/0204032 A1* | 7/2021 | VanSickel | H04N 21/4755 |
| 2022/0083208 A1* | 3/2022 | Kutas | G06F 3/04845 |
| 2022/0366131 A1* | 11/2022 | Ekron | G06F 8/34 |

* cited by examiner

SYSTEMS AND METHODS FOR PRESENTING VISUAL CONTENT

BACKGROUND

Background and Relevant Art

Visual content on a computing device is conventionally navigated with a computer mouse, touchpad, touch sensitive display, or another multi-axis human interface device. Some visual content is provided using directional keys of a keyboard or a scroll wheel of the mouse in a single axis. However, providing mixed visual content of both interactive and non-interactive visual content such as images and text can present a challenge when a multi-axis human interface device is unavailable.

BRIEF SUMMARY

In some embodiments, In some embodiments, a method of navigating visual content includes establishing an interface template including a viewport; obtaining visual content data; identifying at least one focusable element in the visual content data; presenting a first portion of visual content in the viewport on a display device, wherein the visual content is based at least partially on the visual content data; indicating a first focusable element in the viewport with a visual indicator; and responsive to a user input, scrolling the visual content in the viewport when a second focusable element of the visual content is not present in the viewport in a navigation direction of the user input.

In some embodiments, a system for providing visual content to a user includes a computing device that includes a communication device, a processor, and a hardware storage device. The communication device is configured to receive user inputs. The processor is in data communication with the communication device, and the hardware storage device is in data communication with the processor. The hardware storage device has instructions stored thereon that, when executed by the processor, cause the computing device to establish an interface template including a viewport; obtain visual content data; identify at least one focusable element in the visual content data; present a first portion of visual content in the viewport on a display device, wherein the visual content is based at least partially on the visual content data; indicate a first focusable element in the viewport with a visual indicator; and responsive to a user input, scroll the visual content in the viewport when a second focusable element of the visual content is not present in the viewport in a navigation direction of the user input.

In some embodiments, a method of navigating visual content includes, at a computing device, establishing an interface template including a viewport; obtaining visual content data; identifying at least one focusable element in the visual content data; presenting a first portion of visual content in the viewport of a user interface based at least partially on the interface template on a display device, wherein the visual content is based at least partially on the visual content data; indicating a first focusable element in the viewport with a visual indicator; responsive to a user input, scrolling the visual content in the viewport when at least one focusable element of the visual content is not present in the viewport in a navigation direction; and upon beginning scrolling, indicating a scroll element on a scroll bar.

This Summary is provided to introduce a selection of concepts in a simplified form that are further described below in the Detailed Description. This Summary is not intended to identify key features or essential features of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 4-1 is a schematic representation of a user interface (UI) presenting visual content, according to at least some embodiments of the present disclosure;

FIG. 4-2 is a schematic representation of the UI of FIG. 4-1 presenting an expandable element, according to at least some embodiments of the present disclosure;

DETAILED DESCRIPTION

The present disclosure generally relates to systems and methods for presenting visual content to a user and navigating the visual content. More particularly, display devices of video game consoles, set top boxes, and smart televisions can provide a comfortable viewing experience for a user, but such "10-foot experiences" (referring to the user's viewing distance from the device) can have limited input methods that hinder conventional navigation of text, images, and other content. In a specific example, some legacy content can be difficult to translate over a digital environment, such as paginated content, and can present additional challenges to the viewing text content on a 10-foot experience.

In some embodiments, systems and methods according to the present disclosure can import visual content data and present the visual content in a user interface that provides one or more visual indicators to navigate both focusable and non-focusable elements of the visual content.

Figure 1:
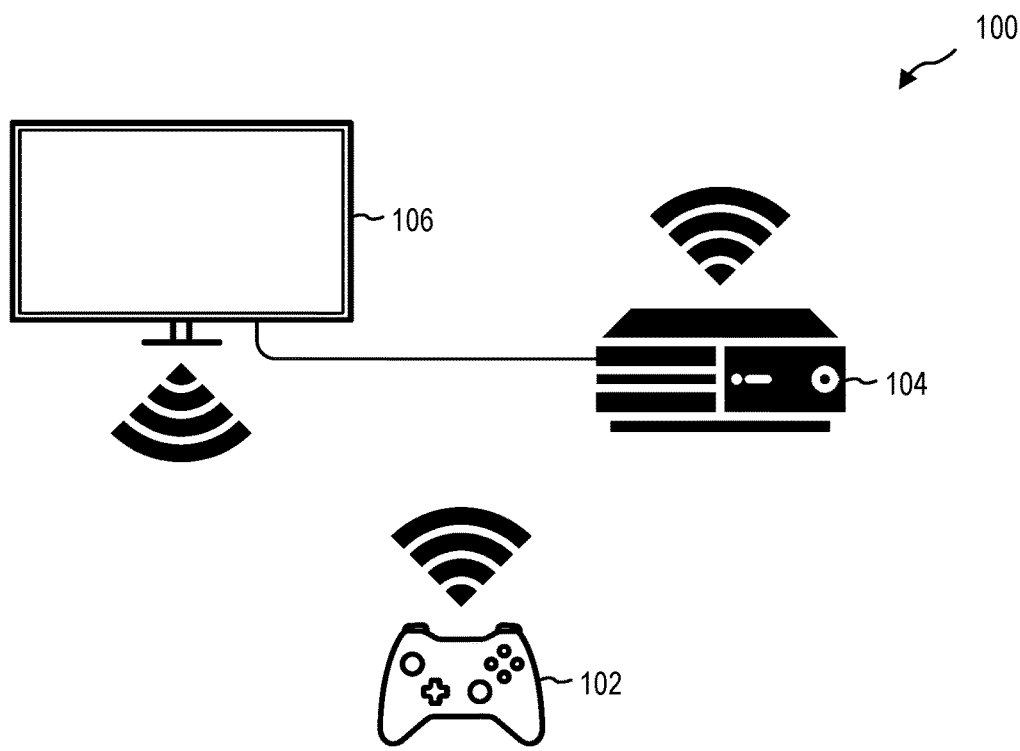
FIG. 1 is a schematic representation of a computing system with a user input device, according to at least some embodiments of the present disclosure.

FIG. 1 illustrates an example system 100 of a user input device 102 communicating with a computing device 104. A user input device, such as a computer game controller, keyboards, joysticks, mouse, or other human interface devices (HID) communicate with a computing device 104 to provide user inputs to the computing device 104. In some embodiments, the computing device 104 is in data communication with a display device 106 or is part of a display device 106. A display device 106 may be a television, a monitor, a tablet, a projector, or any other display device capable of displaying graphical or visual information provided by a processor or memory.

For example, the computing device 104 may be a general-purpose computing device, such as a laptop computer, a desktop computer, a hybrid computer, a tablet computer, or other general-purpose computer that is in data communication with a display device 106. In other examples, the computing device 104 may be integrated with the display device 106, such as a smart television, monitor, projector, or other display device with communication and computation components integrated therein.

In some embodiments, the user input device 102 communicates wirelessly with the computing device 104 such as via a Wi-Fi connection, a BLUETOOTH connection, another radio frequency (RF) communication, optical communication, or other wireless communication method. In some embodiments, the user input device 102 communicates with the computing device 104 through a wired communication, such as universal serial bus (USB) communication, coaxial communication, other industry standard communication, or proprietary wired communication.

The user input device 102 may include a uniaxial input device, such as a scroll wheel, a directional pad, a directional stick (e.g., a thumbstick or joystick), directional keys, or other input device configured to provide a user input with a uniaxial value. In at least one embodiment, the user input device 102 provides a y-direction input to the computing device 104 to navigate visual content displayed on the display device 106.

Figure 2:
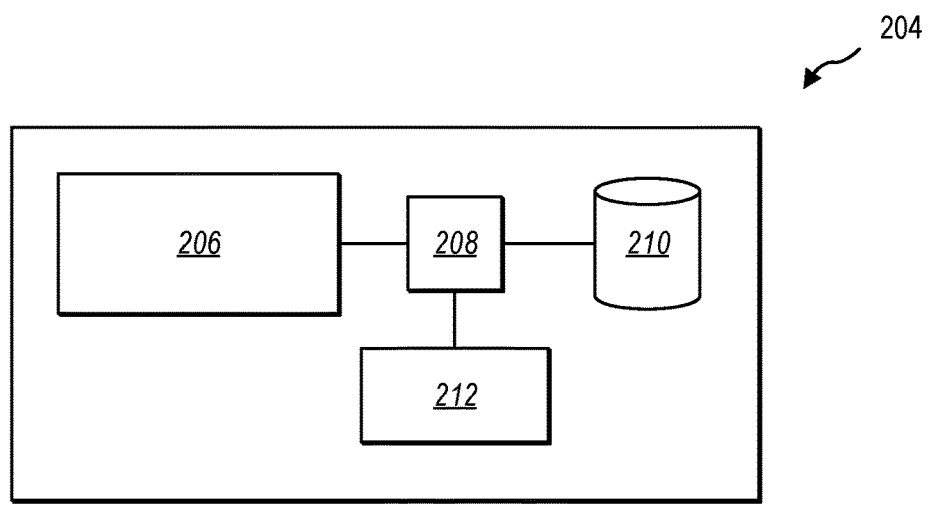
FIG. 2 is a schematic representation of components of a computing device, according to at least some embodiments of the present disclosure.

Referring now to FIG. 2, a computing device 204, in some embodiments, includes a processor 208 that is configured to perform all of, or at least part of, the methods described herein. For example, a computing device 204 includes a processor 208 in communication with a hardware storage device 210. The hardware storage device 210 can be any non-transient computer readable medium that may store instructions thereon. The hardware storage device 210 may be any type of solid-state memory; volatile memory, such as static random access memory (SRAM) or dynamic random access memory (DRAM); non-volatile memory, such as read-only memory (ROM) including programmable ROM (PROM), erasable PROM (EPROM) or EEPROM; magnetic storage media, such as magnetic tape; a platen-based storage device, such as hard disk drives; optical media, such as compact discs (CD), digital video discs (DVD), Blu-ray Discs, or other optical media; removable media such as USB drives; non-removable media such as internal SATA or non-volatile memory express (NVMe) style NAND flash memory; or any other non-transient storage media. The hardware storage device 210 includes instruction stored thereon that, when executed by the processor 208, cause the computing device 204 to perform any method or part of a method described herein.

The computing device 204 further includes a wireless communication device 212, such as a 802.11ax RF transceiver or an 802.11n RF transceiver, that allows wireless transmission and receipt of data from a user input device and/or display device. In some embodiments, the computing device 204 has a plurality of wireless communication devices 212 that provide communication at different frequencies or power levels to communicate with different user input devices and/or display devices.

In some embodiments, the computing device 204 is integrated with or part of display device 206. The display device 206 may be, as described herein, a television, a monitor, a projector, or other display device when connected to the computing device 204, and the display device 206 may be a thin film transistor (TFT) display panel, light emitting diode (LED) display panel, organic LED (OLED) display panel, electronic ink (e-Ink) display panel, or other type of display panel that is integrated with the computing device 204.

The display device 206 may display a user interface (UI) with a viewport. The viewport may be a frame or other graphical element in which visual content such as text, images, or video is presented to a user. In some embodiments, the visual content is legacy visual content that is paginated from legacy image presentation software or physical media (such as physical user manuals) or includes interactive objects intended for viewing using a multi-axis HID, such as a mouse or touchpad. When the visual content is presented on a television, monitor, or projector with a uniaxial user input device, such as with a video game console and video game controller, the visual content may be difficult to read and/or difficult to interact with. In some examples, accessibility of the document is compromised as the pagination can interfere with screen readers and other accessibility tools.

In some embodiments according to the present disclosure, a method for presenting visual content to user allows focusable items from the visual content to be highlighted or otherwise indicated on the UI while providing clear signals to the user as to the flow of the text and/or media of the visual content. The simplified navigation of the legacy or current visual content can improve user experience on a variety of visual content accessed by the computing device. For example, support documentation for a device or system may accumulate over many years with differing formats. Different formats of readable documents can be made accessible on a device according to the present disclosure through methods described herein.

In particular examples, smart televisions and televisions with specialized computing devices such as video game consoles and/or set-top boxes connected thereto have become more common in households. The experience of navigating content on a television, either via a conventional television or set-top box remote or by a video game controller, is different from that of navigating content on a general-purpose computing device with common multi-axis HIDs, such as a computer mouse or touchpad. For example, navigation through a scrollable document that also includes focusable elements can provide challenges to a uniaxial input device such as y-direction buttons or y-direction sticks or some multi-axis HIDs, such as directional pads or directional sticks that move a cursor on screen. While the uniaxial input device may provide accurate and/or intuitive scrolling, interaction with focusable elements may be difficult or non-intuitive, and while the cursor movement on the UI may provide precise interaction with focusable elements, it may not provide accurate and/or intuitive scrolling.

Figure 3:
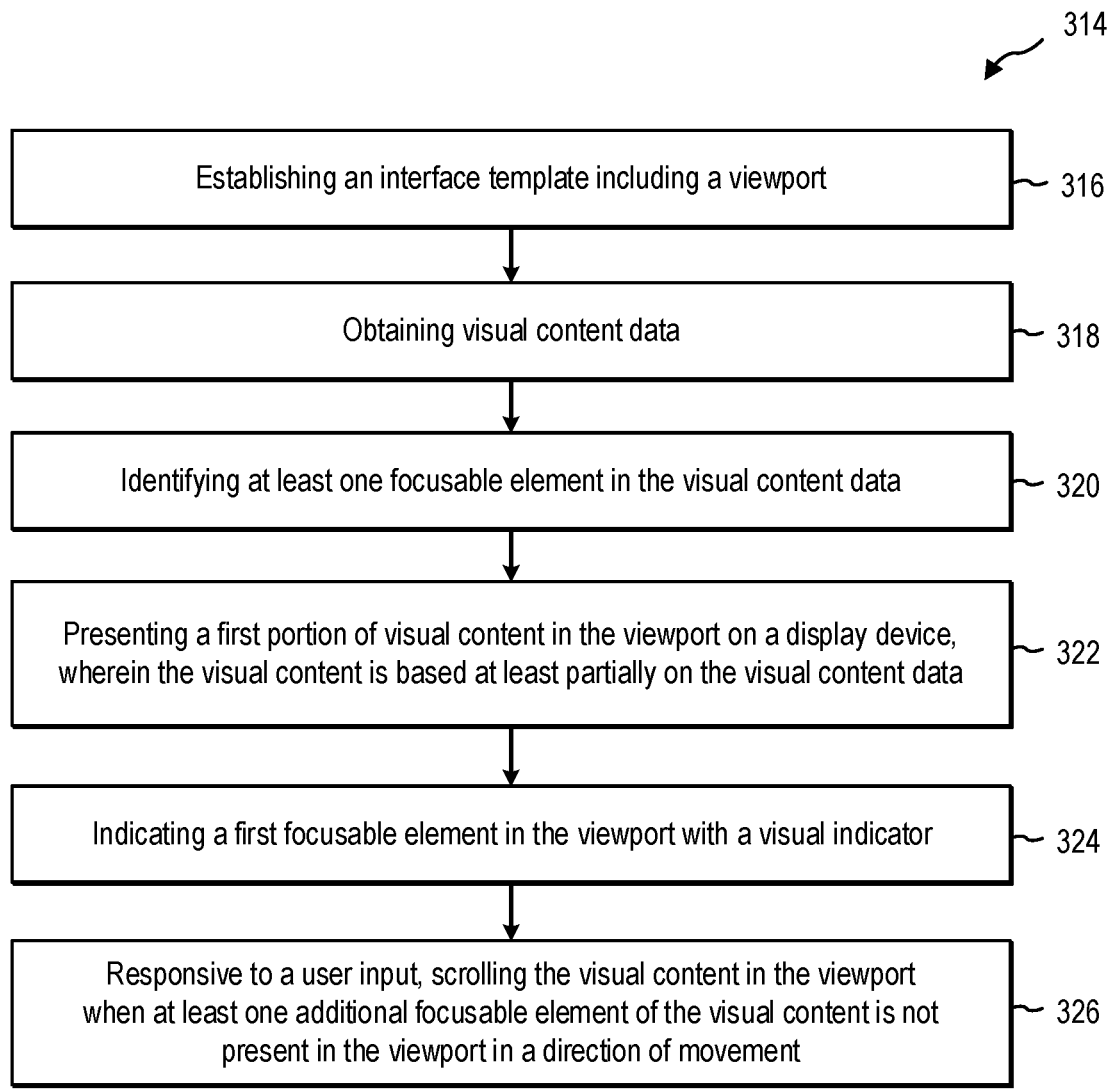
FIG. 3 is a flowchart illustrating a method of presenting visual content, according to at least some embodiments of the present disclosure.

Referring now to FIG. 3, in some embodiments, a method 314 of presenting visual content includes establishing an interface template including a viewport at 316. In some embodiments, establishing the interface template includes accessing the interface template from a hardware storage device. For example, the interface template may be stored locally on a hardware storage device of the computing device. In other examples, the interface template may be stored remotely on a cloud hardware storage device. Establishing the interface template may include loading the interface template into a local cache or other local memory. The method 314 further includes obtaining visual content data at 318. In some embodiments, the interface template is loaded into a cache or other local memory and populated with at least a portion of the visual content data. The visual content data may be obtained locally from a local hardware storage device (such as the hardware storage device 210 of the computing device 204 described in relation to FIG. 2). In some examples, the visual content data is obtained from a remote storage such as a remote computing device (e.g., a server computer or cloud storage device) via a network connection.

To populate the visual content data in the interface template, the method 314 includes identifying at least one focusable element in the visual content data at 320. For example, the visual content data may be a series of elements organized in or accessed from a database or file. The database or file may be parsed to identify properties of the elements therein. For example, at least some elements of the database or file may include an element type, such as an image, video, expandable list, hyperlink, section heading, or other element type that is identified as focusable elements. In some embodiments, any interactive element of the database or file (e.g., any element that a user can interact with to activate, zoom, expand, or otherwise effect a change) is a focusable element. In some embodiments, any interactive element or section heading is a focusable element. In some embodiments, focusable elements are user definable.

After identifying at least one focusable element in the visual content data, the method 314 includes presenting a first portion of the visual content in the viewport of the interface template on a display device, wherein the visual content is based at least partially on the visual content data at 322. For example, the visual content data may be obtained from a JSON file. While a JSON file is human-readable in a text editor software application, the formatting, typeface, font, or other presentation options may be user selectable, and the visual content data in the JSON file may appear different when presented in the viewport.

In some embodiments, the focusable element is an image, a video, or other graphical element that has a preset pixel size (e.g., dimensions) from the visual content data. The focusable element may be scaled based at least partially on a horizontal and/or vertical dimension of the viewport. For example, to allow the focusable element to be visible in its entirety in a viewport with a 1000-pixel height, a 1600×1600 pixel image may be scaled down to fit. In some embodiments, the focusable element is scaled to have a height no more than 100% of the height of the viewport. In some embodiments, the focusable element is scaled to have a height no more than 75% of the height of the viewport. In some embodiments, the focusable element is scaled to have a height no more than 50% of the height of the viewport.

In some embodiments, the visual content presented in the viewport is presented in a stack of elements identified in and/or extracted from the visual content data. For example, a stack of elements may include an article title element, a first paragraph element that describes a device, an expandable bullet list of features related to the device described in the first paragraph element, and an image of the device described in the first paragraph element. In some embodiments, the expandable bullet list element is a focusable element because it is interactive and the user can expand the list to read more of the visual content (e.g., more elements). In some embodiments, the image element is a focusable element because it may open in an enlarged view upon selection.

The method 314 further includes indicating a first focusable element in the viewport with a visual indicator at 324 and, responsive to a user input, scrolling the visual content in the viewport at least one additional focusable element of the visual content is not present in the viewport in a direction of movement based on the user input at 326. In some embodiments, the visual indicator includes highlighting the focusable element in the stack by changing a background color of the focusable element in the stack. In some embodiments, the visual indicator includes highlighting the focusable element in the stack by changing a typeface of the focusable element in the stack. In some embodiments, the visual indicator includes highlighting the focusable element in the stack by changing a font color of the focusable element in the stack. In some embodiments, the visual indicator includes changing a border color of the focusable element in the stack or adding a border to the focusable element. In some embodiments, the visual indicator includes moving (e.g., "shaking") the focusable element in the stack or moving a border of the focusable element.

In some embodiments, indicating a focusable element in the viewport includes moving the stack in the viewport to present the entire focusable element in the viewport. For example, a viewport may have a height of 1000 pixels in the y-direction, and the focusable element may be displayed with a height of 150 pixels. When less than the entire focusable element is visible in the viewport (e.g., 50 pixels of the focusable element in the y-direction), indicating the focusable element may include scrolling the visual content (including the focusable element and other elements) within the viewport such that the entire focusable element is visible in the viewport when indicated. In the example described above, the stack of elements of the visual content scrolls 100 pixels in the y-direction to present all of the 150-pixel focusable element.

When there is not another focusable element in the direction of movement corresponding to the direction of the user input, the visual content is scrolled smoothly until an additional focusable element is at least partially present in the viewport at 326. For example, a first focusable element may be visible in the viewport at the top of the stack of elements in the visual content, while a second focusable element may not be visible within the 1000 y-direction pixels of the viewport. The visual content may scroll through 2000 y-direction pixels of the visual content (and the stack of elements in the visual content) before at least a portion of the second focusable element is visible in the viewport. Upon at least a portion of the second focusable element being visible in the viewport, the second focusable element may be indicated with a visual indicator, as described herein.

When at least a portion of a second focusable element is visible in the viewport while the first focusable element is visible in the viewport, in some embodiments, the visual indicator moves to the second focusable element immediately without scrolling of the visual content in the viewport. By indicating each focusable element with a visual indicator and smoothly scrolling therebetween, the user can easily and intuitively navigate the visual content, interact with any interactive elements, find section headings, scroll through text, and perform other functions without skipping forward or back and losing his or her place in the visual content or missing content.

Figures 1, 4:
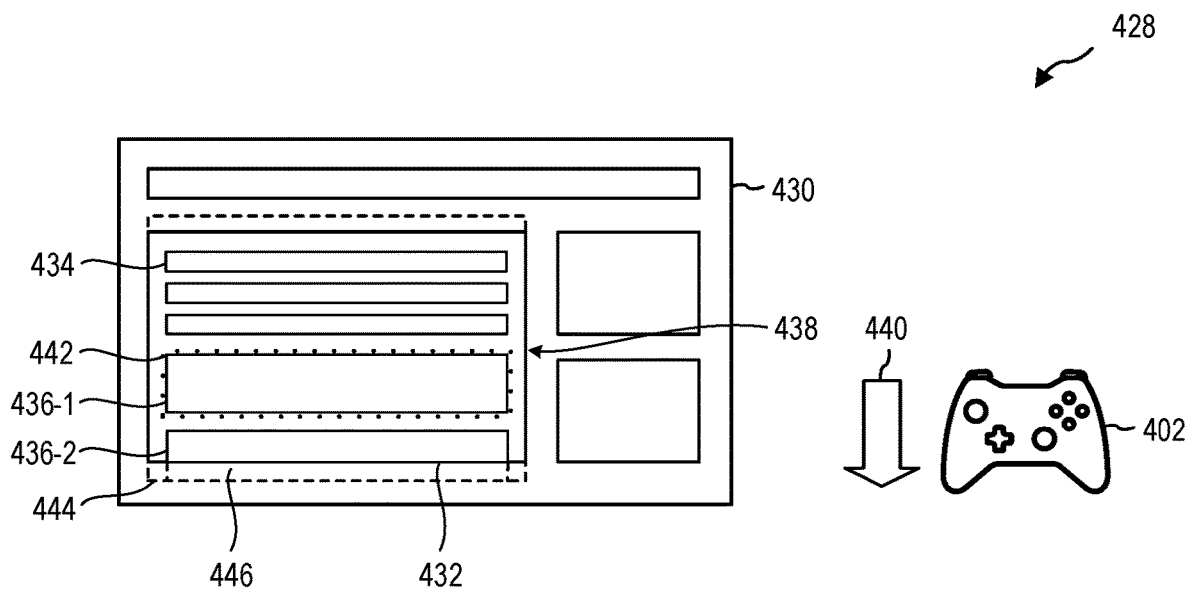
Figures 2, 4:
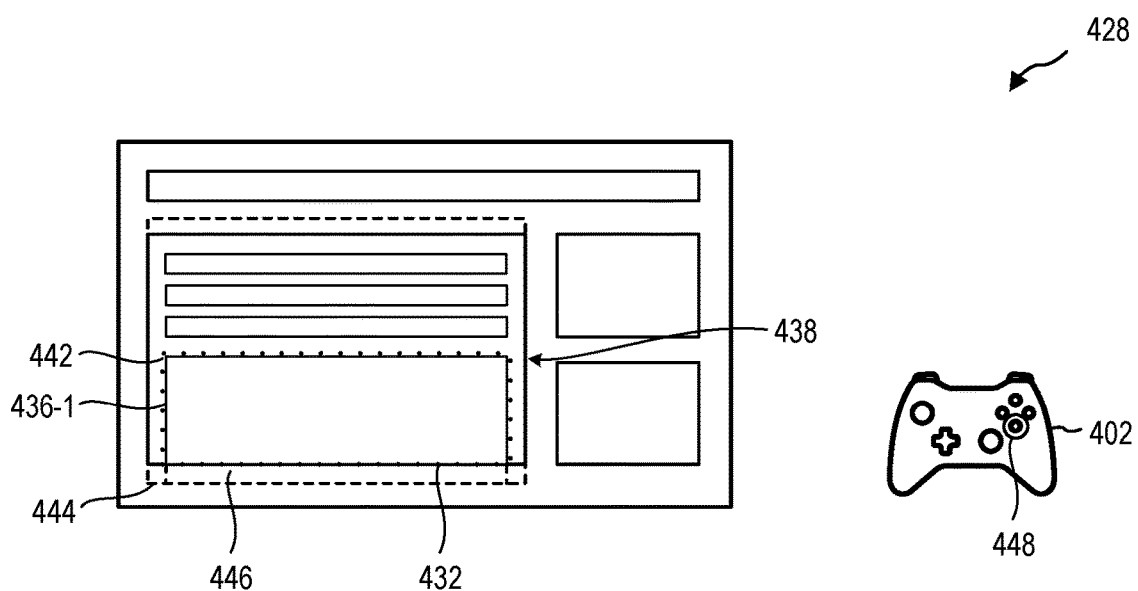

FIG. 4-1 is an embodiment of a UI 428 presented on a display device according to the present disclosure. The UI 428 includes a template 430 with a viewport 432 therein. In some embodiments, the template 430 includes other frames, buttons, fields, or objects. The viewport 432 is configured to present visual content including a plurality of elements 434 including focusable elements 436-1, 436-2 in a stack 438. As described herein, the stack 438 includes elements obtained from visual content data with element types. A directional user input 440 from a user input device 402 instructs the computing device and/or display device presenting the UI 428 to navigate through the stack 438. At least a portion of the stack 438 is not visible in the viewport 432 and, therefore, at least some elements 434 are not visible in the viewport 432. Upon receiving the directional user input 440 (downward in the y-direction), the UI 428 navigates downward through the visual content of the stack 438 in the viewport 432.

In the illustrated embodiment in FIG. 4-1, a first focusable element 436-1 is indicated by a visual indicator 442. In some embodiments, at least a portion of a second focusable element 436-2 is present in the viewport 432. In such an example, the visual indicator 442 moves downward to the second focusable element 436-2 present in the viewport 432. In the example of FIG. 4-1, the second focusable element 436-2 is partially occluded by the edge of the viewport 432, and the stack 438 may move vertically within the viewport 432 to present all of the second focusable element 436-2 when the visual indicator moves to the second focusable element 436-2.

In some embodiments, a second focusable element 436-2 is not visible in the viewport 432 when the downward directional user input 440 is received, and the stack 438 smoothly (e.g., with a substantially continuous and/or stepless movement) scrolls upward, revealing more elements 434 of the stack 438 in the viewport 432. Upon at least a portion of a second focusable element 436-2 being present in the viewport 432, the stack 438 may move vertically within the viewport 432 to present all of the second focusable element 436-2 and the visual indicator moves to the second focusable element 436-2.

In some embodiments, the UI 428 may provide a signal or "signpost" to a user that more visual content is available outside of the viewport 432 by providing a border 444 on the top and/or bottom edge of the viewport 432 in the y-direction. In some embodiments, the border 444 provides a gradient portion 446 of the visual content (for example, by varying opacity of the border 444 or by altering the brightness, color, or other properties of the visual content in the border 444) to blend in or fade out the visual content relative to the viewport 432. In some embodiments, the border 444 is not part of the viewport 432, and elements 434 visible in the border 444 are not present in the viewport 432. In some embodiments, the border 444 is part of the viewport 432, and elements 434 visible in the border 444 are present in the viewport 432.

In some embodiments, the border 444 has a height away from the viewport 432 of at least 15 pixels, at least 25 pixels, or at least 40 pixels. For example, the border 444 can provide some visual signal that additional visual content is available for the user to view, while remaining small enough that the user does not mistake the gradient portion 446 for interactive content. In other embodiments, the border 444 has a height away from the viewport 432 that is relative to the dimensions of the viewport 432. For example, a border 444 adjacent an edge of the viewport 432 in the y-direction may have a height that is at least 1% of the y-direction dimension of the viewport 432. In another example, a border 444 adjacent an edge of the viewport 432 in the y-direction may have a height that is at least 2% of the y-direction dimension of the viewport 432. In yet another example, a border 444 adjacent an edge of the viewport 432 in the y-direction may have a height that is at least 5% of the y-direction dimension of the viewport 432. In a further example, a border 444 adjacent an edge of the viewport 432 in the y-direction may have a height that is no more than 5% of the y-direction dimension of the viewport 432.

It should be understood that that while the present disclosure describes embodiments of stacks and UIs that present visual content in a vertical scroll and/or navigation (e.g., y-direction of the UI), a horizontal scroll and/or navigation of visual content in a UI is contemplated within the present disclosure, and any description of y-direction inputs or navigation should be equally applicable to other or additional directions. For example, while the border 444 of FIG. 4-1 is adjacent the viewport 432 in the y-direction, in other examples, a border 444 may be present on an edge of the viewport in an x-direction.

FIG. 4-2 is an embodiment of the UI 428 of FIG. 4-1 with the first focusable element 436-1 expanded when highlighted by the visual indicator 442. In some embodiments, an expandable element automatically expands to present additional content, such as bullet lists, a larger dimension image, or other expandable content, when the expandable element is focused upon through a user input, such as the directional user input 440 described in relation to FIG. 4-1. In some embodiments, an expandable element selectively expands when the expandable element is focused upon through a directional user input and indicated by the visual indicator 442, and the expandable element is subsequently activated by a selection user input 448 on the user input device 402.

In some embodiments, upon expanding the first focusable element 436-1 in the viewport 432, a portion of the first focusable element 436-1 extends past the edge of the viewport 432 and/or into the border 444. In some embodiments, the stack 438 may move vertically within the viewport 432 to present all of the first focusable element 436-1 and the visual indicator 442 surrounds the first focusable element 436-1. In some embodiments, the stack 438 and the first focusable element 436-1 does not move within the viewport 432, and the visual indicator 442 surrounds the portion of the first focusable element 436-1 currently within the viewport 432. In such embodiments, a border 444 and/or gradient portion 446 of the first focusable element 436-1 provide a visual cue or signal to the user that additional portions of the first focusable element 436-1 are available for viewing by navigating downward after expanding the first focusable element 436-1. In at least one example, a directional user input from the user input device 402 may move the stack 438 within the viewport 432 to present the entire first focusable element 436-1. In at least another example, a directional user input from the user input device 402 may scroll the stack 438 to smoothly present more of the first focusable element 436-1 in the viewport 432.

Similarly, at least a portion of a first focusable element 436-1 may be partially occluded by the edge of the viewport 432 upon loading of the visual content in the viewport 432. For example, the stack 438, upon loading the visual content in the UI 428 and prior to a user input, may load with the first focusable element 436-1 partially in the viewport 432 and partially outside of the viewport 432. In some embodiments, upon receiving a user input from the user input device 402, the stack 438 may move vertically within the viewport 432 to present all of the first focusable element 436-1 and the visual indicator 442 indicates the first focusable element 436-1.

Figure 5:
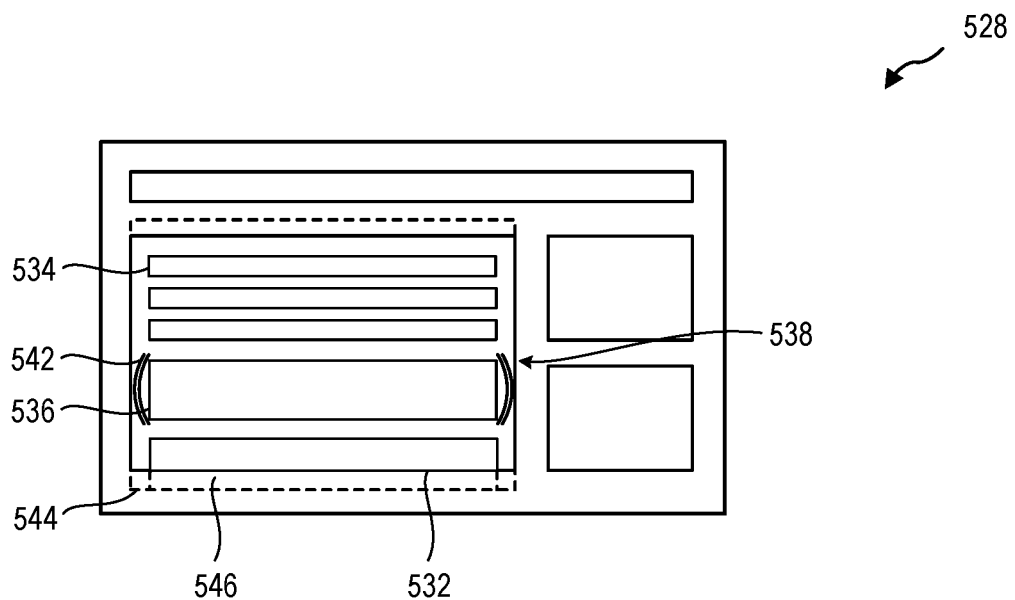
FIG. 5 is a schematic representation of a UI with a movement visual indicator, according to at least some embodiments of the present disclosure.

While a visual indicator surrounding the focusable element has been described herein, other visual indicators are contemplated. For example, FIG. 5 illustrates an embodiment of a UI 528 using a shaking visual indicator 542 for a focusable element 536. In some embodiments, the focusable element 536 may move, oscillate, or shake relative to the other elements 534 of the stack 538 to draw the user's attention to the focusable element 536. In some embodiments, a persistent visual indicator (such as a border or color change) can interfere with reading the content of the focusable element 536. Additionally, in some embodiments, flashing colors or borders can produce discomfort in users. A temporary movement of the focusable element 536 can draw the user's attention without substantially altering the content of the focusable element 536.

In some embodiments, the movement visual indicator 542 moves the focusable element 536 perpendicular to a navigation direction. For example, the movement visual indicator 542 may shake the focusable element 536 relative to other elements 534 in a horizontal direction when the stack 538 scrolls or moves in the vertical direction in the viewport 532. Perpendicular movement can maintain consistent spacing of elements 534 in the stack 538 even during movement of the focusable element 536.

In some embodiments, the movement visual indicator 542 moves the focusable element 536 parallel to a navigation direction. For example, the movement visual indicator 542 may shake the focusable element 536 relative to other elements 534 in a vertical direction when the stack 538 scrolls or moves in the vertical direction in the viewport 532. Parallel movement can maintain consistent margins of the focusable element 536 in the perpendicular direction within the viewport 532 during movement of the focusable element 536. In some embodiments, a gradient portion 546 of a focusable element 536 may move in the border 544 when a portion of the focusable element 536 is located in the border 544.

Figure 6:
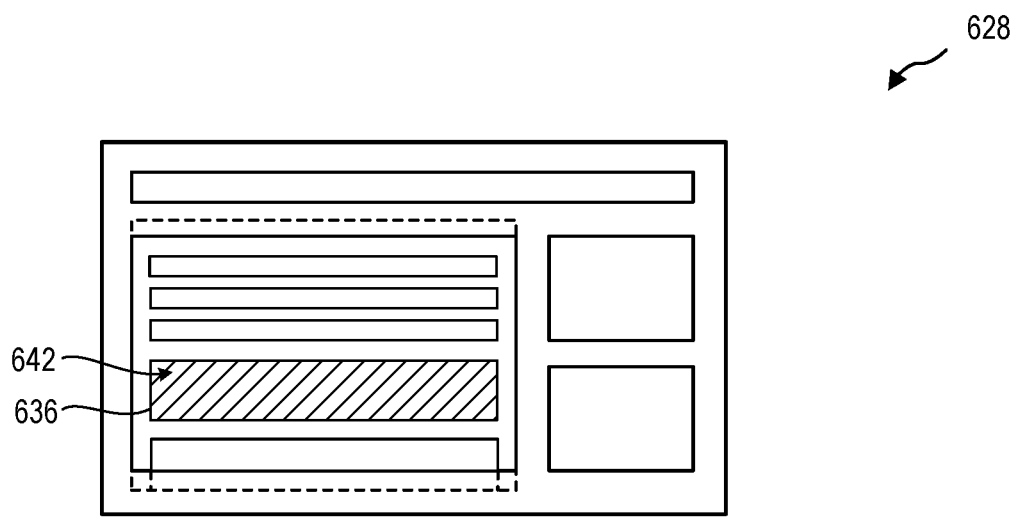
FIG. 6 is a schematic representation of a UI with a highlighting visual indicator, according to at least some embodiments of the present disclosure.

FIG. 6 illustrates another embodiment of a visual indicator 642 in a UI 628. The visual indicator 642 is a highlighting visual indicator that changes a color, typeface, font, or other visual property of the focusable element 636 when the visual indicator 642 indicates the focusable element 636. For example, the visual indicator 642 may change a background color of the focusable element 636. In another example, the visual indicator 642 may change a color of the text of the focusable element 636. In yet another example, the visual indicator 642 may change a typeface or size of the text of the focusable element 636. In some embodiments, however, modifying the presentation of the focusable element 636 may interfere with a user's ability to read or interpret the content of the focusable element 636.

Figure 7:
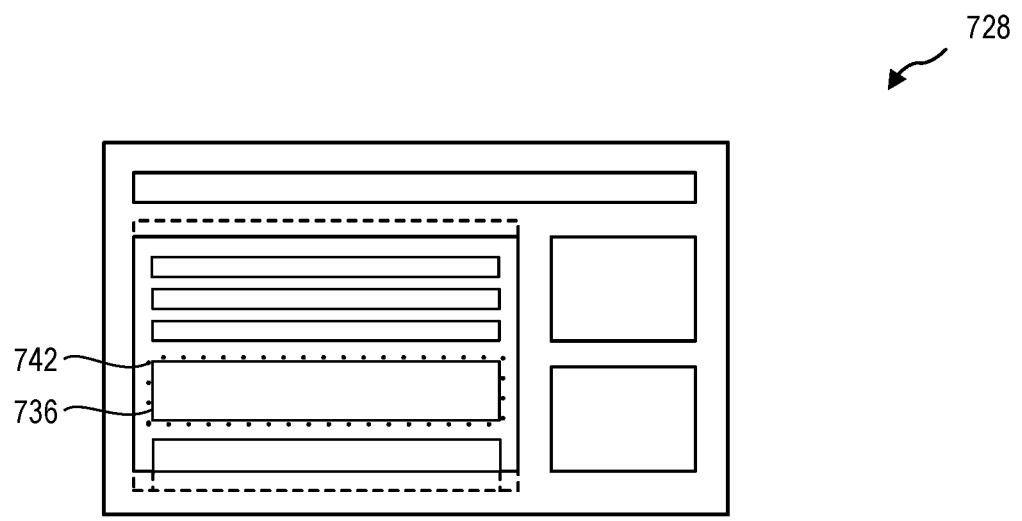
FIG. 7 is a schematic representation of a UI with a border visual indicator, according to at least some embodiments of the present disclosure.

FIG. 7 illustrates an embodiment of a visual indicator 742 that modifies an edge or border of the focusable element 736 in a UI 728. The visual indicator 742 is a border visual indicator that changes a color, thickness, gradient, or other visual property of a perimeter of the focusable element 736 when the visual indicator 742 indicates the focusable element 736. For example, the visual indicator 742 may change a border color of the focusable element 736. In another example, the visual indicator 742 may add a color "glow" or "halo" around the focusable element 736. In yet another example, the visual indicator 742 may change a thickness or shape of a border of the focusable element 736.

While the visual indicators describe herein draw the user's attention to the focusable elements of visible in the viewport, in some embodiments, no focusable element is present in the viewport. In such instances, a visual indicator may draw the user's attention to a scroll element of the UI that provide visual feedback as to the location of the visual content relative to the viewport, and the scroll element can provide context for the user's location in the visual content while scrolling.

Figure 8:
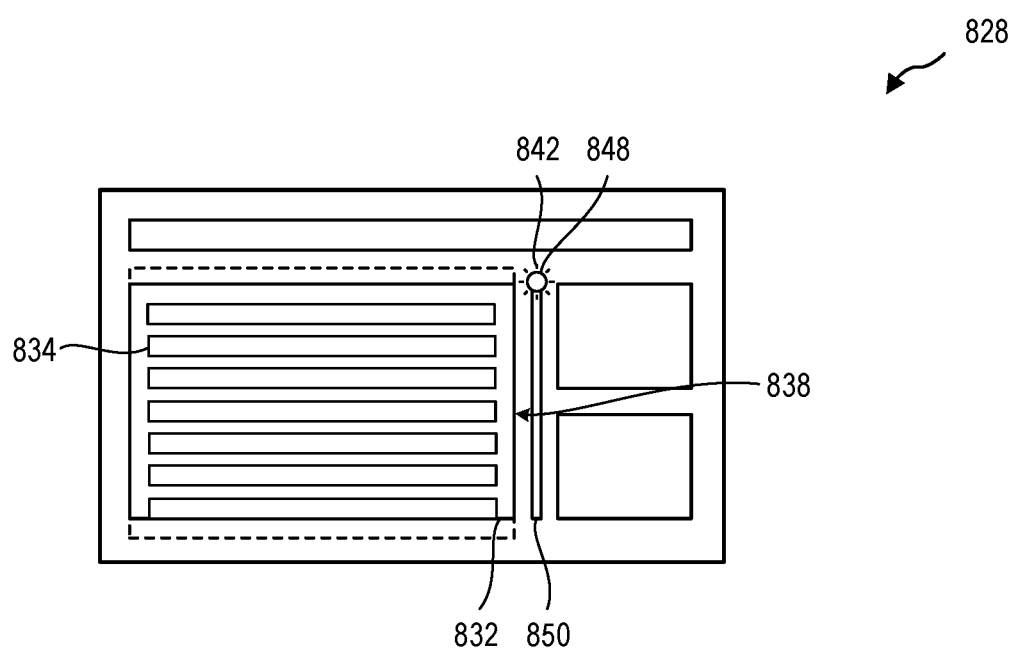
FIG. 8 is a schematic representation of a UI with a scroll element and a visual indicator, according to at least some embodiments of the present disclosure.

FIG. 8 represents a UI 828 with a viewport 832 presenting a portion of a stack 838 of elements 834. The UI 828 includes a scroll element 848 that moves relative to a scroll bar 850 to provide the user with feedback and/or context of the user's viewing location in visual content. In other words, the scroll element 848 may show to the user the location of the visual content currently visible in the viewport 832 is in the stack 838 of elements 834.

In some embodiments, when the UI 828 is scrolling through the stack 838 in response to a directional user input, the scroll element 848 may have a visual indicator 842 (such as any of the visual indicators described herein) associated with the scroll element 848. The visual indicator 842 can draw the user's attention to the scroll element 848, in some embodiments, to inform the user that the UI is scrolling without focusing on any focusable elements, and, in some embodiments, to provide location information of the position of the visual content in the viewport 832. In some embodiments, the visual indicator 842 is present when a focusable element leaves the viewport. For example, the movement of a focusable element with a visual indicator within the viewport 832 may be sufficient visual feedback to a user to represent the scrolling of the stack 838, and the visual indicator 842 is present on the scroll element 848 only when a focusable element is not visible. In other embodiments, the visual indicator 842 is present on the scroll element 848 at any time the stack 838 moves by scrolling relative to the viewport 832.

In some embodiments, the visual indicator 842 moves between the focusable elements and the scroll element 848 such that the visual indicator 842 is always present on the UI 828 and indicating the current navigation mode of the UI 828 through the visual content in the viewport 832.

In at least some embodiments, a UI that allows for the presentation of a variety of formats in an intuitive and simply navigation with limited input controls can improve a user experience with a variety of devices.

INDUSTRIAL APPLICABILITY

The present disclosure generally relates to systems and methods for presenting visual content to a user. More particularly, display devices of video game consoles, set top boxes, and smart televisions can provide a comfortable viewing experience for a user, but such "10 foot experiences" (referring to the user's viewing distance from the device) can have limited input methods that hinder conventional navigation of text, images, and other content. In a specific example, some legacy content can be difficult to translate over a digital environment, such as paginated content, and can present additional challenges to the viewing text content on a 10-foot experience.

In some embodiments, systems and methods according to the present disclosure can import visual content data and present the visual content in a user interface that provides one or more visual indicators to navigate both focusable and non-focusable elements of the visual content.

In some embodiments, a system includes a user input device communicating with a computing device. A user input device, such as a computer game controller, keyboards, joysticks, mouse, or other human interface devices (HID) communicate with a computing device to provide user inputs to the computing device. In some embodiments, the computing device is in data communication with a display device or is part of a display device. A display device may be a television, a monitor, a tablet, a projector, or any other display device capable of displaying graphical or visual information provided by a processor or memory.

For example, the computing device may be a general-purpose computing device, such as a laptop computer, a desktop computer, a hybrid computer, a tablet computer, or other general-purpose computer that is in data communication with a display device. In other examples, the computing device may be integrated with the display device, such as a smart television, monitor, projector, or other display device with communication and computation components integrated therein.

In some embodiments, the user input device communicates wirelessly with the computing device such as via a Wi-Fi connection, a BLUETOOTH connection, another radio frequency (RF) communication, optical communication, or other wireless communication method. In some embodiments, the user input device communicates with the computing device through a wired communication, such as universal serial bus (USB) communication, coaxial communication, other industry standard communication, or proprietary wired communication.

The user input device may include a uniaxial input device, such as a scroll wheel, a directional pad, a directional stick (e.g., a thumbstick or joystick), directional keys, or other input device configured to provide a user input with a uniaxial value. In at least one embodiment, the user input device provides a y-direction input to the computing device to navigate visual content displayed on the display device.

A computing device, in some embodiments, includes a processor that is configured to perform all of, or at least part of, the methods described herein. For example, a computing device includes a processor in communication with a hardware storage device. The hardware storage device can be any non-transient computer readable medium that may store instructions thereon. The hardware storage device may be any type of solid-state memory; volatile memory, such as static random access memory (SRAM) or dynamic random access memory (DRAM); non-volatile memory, such as read-only memory (ROM) including programmable ROM (PROM), erasable PROM (EPROM) or EEPROM; magnetic storage media, such as magnetic tape; a platen-based storage device, such as hard disk drives; optical media, such as compact discs (CD), digital video discs (DVD), Blu-ray Discs, or other optical media; removable media such as USB drives; non-removable media such as internal SATA or non-volatile memory express (NVMe) style NAND flash memory; or any other non-transient storage media. The hardware storage device includes instruction stored thereon that, when executed by the processor, cause the computing device to perform any method or part of a method described herein.

The computing device further includes a wireless communication device, such as a 802.11ax RF transceiver or an 802.11n RF transceiver, that allows wireless transmission and receipt of data from a user input device and/or display device. In some embodiments, the computing device has a plurality of wireless communication devices that provide communication at different frequencies or power levels to communicate with different user input devices and/or display devices.

In some embodiments, the computing device is integrated with or part of display device. The display device may be, as described herein, a television, a monitor, a projector, or other display device when connected to the computing device, and the display device may be a thin film transistor (TFT) display panel, light emitting diode (LED) display panel, organic LED (OLED) display panel, electronic ink (e-Ink) display panel, or other type of display panel that is integrated with the computing device.

The display device may display a user interface (UI) with a viewport. The viewport may be a frame or other graphical element in which visual content such as text, images, or video is presented to a user. In some embodiments, the visual content is legacy visual content that is paginated from legacy image presentation software or physical media (such as physical user manuals) or includes interactive objects intended for viewing using a multi-axis HID, such as a mouse or touchpad. When the visual content is presented on a television, monitor, or projector with a uniaxial user input device, such as with a video game console and video game controller, the visual content may be difficult to read and/or difficult to interact with. In some examples, accessibility of the document is compromised as the pagination can interfere with screen readers and other accessibility tools.

In some embodiments according to the present disclosure, a method for presenting visual content to user allows focusable items from the visual content to be highlighted or otherwise indicated on the UI while providing clear signals to the user as to the flow of the text and/or media of the visual content. The simplified navigation of the legacy or current visual content can improve user experience on a variety of visual content accessed by the computing device. For example, support documentation for a device or system may accumulate over many years with differing formats. Different formats of readable documents can be made accessible on a device according to the present disclosure through methods described herein.

In particular examples, smart televisions and televisions with specialized computing devices such as video game consoles and/or set-top boxes connected thereto have become more common in households. The experience of navigating content on a television, either via a conventional television or set-top box remote or by a video game controller, is different from that of navigating content on a general-purpose computing device with common multi-axis HIDs, such as a computer mouse or touchpad. For example, navigation through a scrollable document that also includes focusable elements can provide challenges to a uniaxial input device such as y-direction buttons or y-direction sticks or some multi-axis HIDs, such as directional pads or directional sticks that move a cursor on screen. While the uniaxial input device may provide accurate and/or intuitive scrolling, interaction with focusable elements may be difficult or non-intuitive, and while the cursor movement on the UI may provide precise interaction with focusable elements, it may not provide accurate and/or intuitive scrolling.

In some embodiments, a method of presenting visual content includes establishing an interface template including a viewport. In some embodiments, establishing the interface template includes accessing the interface template from a hardware storage device. For example, the interface template may be stored locally on a hardware storage device of the computing device. In other examples, the interface template may be stored remotely on a cloud hardware storage device. Establishing the interface template may include loading the interface template into a local cache or other local memory. The method further includes obtaining visual content data. In some embodiments, the interface template is loaded into a cache or other local memory and populated with at least a portion of the visual content data. The visual content data may be obtained locally from a local hardware storage device (such as the hardware storage device of the computing device). In some examples, the visual content data is obtained from a remote storage such as a remote computing device (e.g., a server computer or cloud storage device) via a network connection.

To populate the visual content data in the interface template, the method includes identifying at least one focusable element in the visual content data. For example, the visual content data may be a series of elements organized in or accessed from a database or file. The database or file may be parsed to identify properties of the elements therein. For example, at least some elements of the database or file may include an element type, such as an image, video, expandable list, hyperlink, section heading, or other element type that is identified as focusable elements. In some embodiments, any interactive element of the database or file (e.g., any element that a user can interact with to activate, zoom, expand, or otherwise effect a change) is a focusable element. In some embodiments, any interactive element or section heading is a focusable element. In some embodiments, focusable elements are user definable.

After identifying at least one focusable element in the visual content data, the method includes presenting a first portion of the visual content in the viewport of the interface template on a display device, wherein the visual content is based at least partially on the visual content data. For example, the visual content data may be obtained from a JSON file. While a JSON file is human-readable in a text editor software application, the formatting, typeface, font, or other presentation options may be user selectable, and the visual content data in the JSON file may appear different when presented in the viewport.

In some embodiments, the focusable element is an image, a video, or other graphical element that has a preset pixel size (e.g., dimensions) from the visual content data. The focusable element may be scaled based at least partially on a horizontal and/or vertical dimension of the viewport. For example, to allow the focusable element to be visible in its entirety in a viewport with a 1000-pixel height, a 1600×1600 pixel image may be scaled down to fit. In some embodiments, the focusable element is scaled to have a height no more than 100% of the height of the viewport. In some embodiments, the focusable element is scaled to have a height no more than 75% of the height of the viewport. In some embodiments, the focusable element is scaled to have a height no more than 50% of the height of the viewport.

In some embodiments, the visual content presented in the viewport is presented in a stack of elements identified in and/or extracted from the visual content data. For example, a stack of elements may include an article title element, a first paragraph element that describes a device, an expandable bullet list of features related to the device described in the first paragraph element, and an image of the device described in the first paragraph element. In some embodiments, the expandable bullet list element is a focusable element because it is interactive and the user can expand the list to read more of the visual content (e.g., more elements). In some embodiments, the image element is a focusable element because it may open in an enlarged view upon selection.

The method further includes indicating a first focusable element in the viewport with a visual indicator and, responsive to a user input, scrolling the visual content in the viewport at least one additional focusable element of the visual content is not present in the viewport in a direction of movement based on the user input. In some embodiments, the visual indicator includes highlighting the focusable element in the stack by changing a background color of the focusable element in the stack. In some embodiments, the visual indicator includes highlighting the focusable element in the stack by changing a typeface of the focusable element in the stack. In some embodiments, the visual indicator includes highlighting the focusable element in the stack by changing a font color of the focusable element in the stack. In some embodiments, the visual indicator includes changing a border color of the focusable element in the stack or adding a border to the focusable element. In some embodiments, the visual indicator includes moving (e.g., "shaking") the focusable element in the stack or moving a border of the focusable element.

In some embodiments, indicating a focusable element in the viewport includes moving the stack in the viewport to present the entire focusable element in the viewport. For example, a viewport may have a height of 1000 pixels in the y-direction, and the focusable element may be displayed with a height of 150 pixels. When less than the entire focusable element is visible in the viewport (e.g., 50 pixels of the focusable element in the y-direction), indicating the focusable element may include scrolling the visual content (including the focusable element and other elements) within the viewport such that the entire focusable element is visible in the viewport when indicated. In the example described above, the stack of elements of the visual content scrolls 100 pixels in the y-direction to present all of the 150-pixel focusable element.

When there is not another focusable element in the direction of movement corresponding to the direction of the user input, the visual content is scrolled smoothly until an additional focusable element is at least partially present in the viewport. For example, a first focusable element may be visible in the viewport at the top of the stack of elements in the visual content, while a second focusable element may not be visible within the 1000 y-direction pixels of the viewport. The visual content may scroll through 2000 y-direction pixels of the visual content (and the stack of elements in the visual content) before at least a portion of the second focusable element is visible in the viewport. Upon at least a portion of the second focusable element being visible in the viewport, the second focusable element may be indicated with a visual indicator, as described herein.

When at least a portion of a second focusable element is visible in the viewport while the first focusable element is visible in the viewport, in some embodiments, the visual indicator moves to the second focusable element immediately without scrolling of the visual content in the viewport.

By indicating each focusable element with a visual indicator and smoothly scrolling therebetween, the user can easily and intuitively navigate the visual content, interact with any interactive elements, find section headings, scroll through text, and perform other functions without skipping forward or back and losing his or her place in the visual content or missing content.

In some embodiments, a UI is presented on a display device according to the present disclosure. The UI includes a template with a viewport therein. In some embodiments, the template includes other frames, buttons, fields, or objects. The viewport is configured to present visual content including a plurality of elements including focusable elements in a stack. As described herein, the stack includes elements obtained from visual content data with element types. A directional user input from a user input device instructs the computing device and/or display device presenting the UI to navigate through the stack. At least a portion of the stack is not visible in the viewport and, therefore, at least some elements are not visible in the viewport. Upon receiving the directional user input (downward in the y-direction), the UI navigates downward through the visual content of the stack in the viewport.

In some embodiments, a first focusable element is indicated by a visual indicator. In some embodiments, at least a portion of a second focusable element is present in the viewport. In such an example, the visual indicator moves downward to the second focusable element present in the viewport. In some examples, the second focusable element partially occluded by the edge of the viewport, and the stack may move vertically within the viewport to present all of the second focusable element when the visual indicator moves to the second focusable element.

In some embodiments, a second focusable element is not visible in the viewport when the downward directional user input is received, and the stack smoothly (e.g., with a substantially continuous and/or stepless movement) scrolls upward, revealing more elements of the stack in the viewport. Upon at least a portion of a second focusable element being present in the viewport, the stack may move vertically within the viewport to present all of the second focusable element and the visual indicator moves to the second focusable element.

In some embodiments, the UI may provide a signal or "signpost" to a user that more visual content is available outside of the viewport by providing a border on the top and/or bottom edge of the viewport in the y-direction. In some embodiments, the border provides a gradient portion of the visual content (for example, by varying opacity of the border or by altering the brightness, color, or other properties of the visual content in the border) to blend in or fade out the visual content relative to the viewport. In some embodiments, the border is not part of the viewport, and elements visible in the border are not present in the viewport. In some embodiments, the border is part of the viewport, and elements visible in the border are present in the viewport.

In some embodiments, the border has a height away from the viewport of at least 15 pixels, at least 25 pixels, or at least 40 pixels. For example, the border can provide some visual signal that additional visual content is available for the user to view, while remaining small enough that the user does not mistake the gradient portion for interactive content. In other embodiments, the border has a height away from the viewport that is relative to the dimensions of the viewport. For example, a border adjacent an edge of the viewport in the y-direction may have a height that is at least 1% of the y-direction dimension of the viewport. In another example, a border adjacent an edge of the viewport in the y-direction may have a height that is at least 2% of the y-direction dimension of the viewport. In yet another example, a border adjacent an edge of the viewport in the y-direction may have a height that is at least 5% of the y-direction dimension of the viewport. In a further example, a border adjacent an edge of the viewport in the y-direction may have a height that is no more than 5% of the y-direction dimension of the viewport.

It should be understood that that while the present disclosure describes embodiments of stacks and UIs that present visual content in a vertical scroll and/or navigation (e.g., y-direction of the UI), a horizontal scroll and/or navigation of visual content in a UI is contemplated within the present disclosure, and any description of y-direction inputs or navigation should be equally applicable to other or additional directions. For example, while the border may be adjacent the viewport in the y-direction, in other examples, a border may be present on an edge of the viewport in an x-direction.

In some embodiments, an expandable element automatically expands to present additional content, such as bullet lists, a larger dimension image, or other expandable content, when the expandable element is focused upon through a user input, such as the directional user input described herein. In some embodiments, an expandable element selectively expands when the expandable element is focused upon through a directional user input and indicated by the visual indicator, and the expandable element is subsequently activated by a selection user input on the user input device.

In some embodiments, upon expanding the first focusable element in the viewport, a portion of the first focusable element extends past the edge of the viewport and/or into the border. In some embodiments, the stack may move vertically within the viewport to present all of the first focusable element and the visual indicator surrounds the first focusable element. In some embodiments, the stack and the first focusable element does not move within the viewport, and the visual indicator surrounds the portion of the first focusable element currently within the viewport. In such embodiments, a border and/or gradient portion of the first focusable element provide a visual cue or signal to the user that additional portions of the first focusable element are available for viewing by navigating downward after expanding the first focusable element. In at least one example, a directional user input from the user input device may move the stack within the viewport to present the entire first focusable element. In at least another example, a directional user input from the user input device may scroll the stack to smoothly present more of the first focusable element in the viewport.

Similarly, at least a portion of a first focusable element may be partially occluded by the edge of the viewport upon loading of the visual content in the viewport. For example, the stack, upon loading the visual content in the UI and prior to a user input, may load with the first focusable element partially in the viewport and partially outside of the viewport. In some embodiments, upon receiving a user input from the user input device, the stack may move vertically within the viewport to present all of the first focusable element and the visual indicator indicates the first focusable element.

While a visual indicator surrounding the focusable element has been described herein, other visual indicators are contemplated. In some embodiments, the focusable element may move, oscillate, or shake relative to the other elements of the stack to draw the user's attention to the focusable element. In some embodiments, a persistent visual indicator (such as a border or color change) can interfere with reading the content of the focusable element. Additionally, in some embodiments, flashing colors or borders can produce discomfort in users. A temporary movement of the focusable element can draw the user's attention without substantially altering the content of the focusable element.

In some embodiments, the movement visual indicator moves the focusable element perpendicular to a navigation direction. For example, the movement visual indicator may shake the focusable element relative to other elements in a horizontal direction when the stack scrolls or moves in the vertical direction in the viewport. Perpendicular movement can maintain consistent spacing of elements in the stack even during movement of the focusable element.

In some embodiments, the movement visual indicator moves the focusable element parallel to a navigation direction. For example, the movement visual indicator may shake the focusable element relative to other elements in a vertical direction when the stack scrolls or moves in the vertical direction in the viewport. Parallel movement can maintain consistent margins of the focusable element in the perpendicular direction within the viewport during movement of the focusable element. In some embodiments, a gradient portion of a focusable element may move in the border when a portion of the focusable element is located in the border.

In some embodiments, a visual indicator is a highlighting visual indicator that changes a color, typeface, font, or other visual property of the focusable element when the visual indicator indicates the focusable element. For example, the visual indicator may change a background color of the focusable element. In another example, the visual indicator may change a color of the text of the focusable element. In yet another example, the visual indicator may change a typeface or size of the text of the focusable element. In some embodiments, however, modifying the presentation of the focusable element may interfere with a user's ability to read or interpret the content of the focusable element.

In some embodiments, the visual indicator is a border visual indicator that changes a color, thickness, gradient, or other visual property of a perimeter of the focusable element when the visual indicator indicates the focusable element. For example, the visual indicator may change a border color of the focusable element. In another example, the visual indicator may add a color "glow" or "halo" around the focusable element. In yet another example, the visual indicator may change a thickness or shape of a border of the focusable element.

While the visual indicators describe herein draw the user's attention to the focusable elements of visible in the viewport, in some embodiments, no focusable element is present in the viewport. In such instances, a visual indicator may draw the user's attention to a scroll element of the UI that provide visual feedback as to the location of the visual content relative to the viewport, and the scroll element can provide context for the user's location in the visual content while scrolling.

The UI may include a scroll element that moves relative to a scroll bar to provide the user with feedback and/or context of the user's viewing location in visual content. In other words, the scroll element may show to the user the location of the visual content currently visible in the viewport is in the stack of elements.

In some embodiments, when the UI is scrolling through the stack in response to a directional user input, the scroll element may have a visual indicator (such as any of the visual indicators described herein) associated with the scroll element. The visual indicator can draw the user's attention to the scroll element, in some embodiments, to inform the user that the UI is scrolling without focusing on any focusable elements, and, in some embodiments, to provide location information of the position of the visual content in the viewport. In some embodiments, the visual indicator is present when a focusable element leaves the viewport. For example, the movement of a focusable element with a visual indicator within the viewport may be sufficient visual feedback to a user to represent the scrolling of the stack, and the visual indicator is present on the scroll element only when a focusable element is not visible. In other embodiments, the visual indicator is present on the scroll element at any time the stack moves by scrolling relative to the viewport.

In some embodiments, the visual indicator moves between the focusable elements and the scroll element such that the visual indicator is always present on the UI and indicating the current navigation mode of the UI through the visual content in the viewport.

In at least some embodiments, a UI that allows for the presentation of a variety of formats in an intuitive and simply navigation with limited input controls can improve a user experience with a variety of devices.

The present disclosure relates to systems and methods for presenting visual content to a user according to at least the examples provided in the sections below:

[A1] In some embodiments, a method of navigating visual content includes establishing an interface template including a viewport; obtaining visual content data; identifying at least one focusable element in the visual content data; presenting a first portion of visual content in the viewport on a display device, wherein the visual content is based at least partially on the visual content data; indicating a first focusable element in the viewport with a visual indicator; and responsive to a user input, scrolling the visual content in the viewport when a second focusable element of the visual content is not present in the viewport in a navigation direction of the user input.

[A2] In some embodiments, the method of [A1] includes, responsive to the user input, moving the visual indicator to the second focusable element when at least a portion of the second focusable element is present in the viewport.

[A3] In some embodiments, the user input of [A1] or [A2] is a uniaxial directional user input.

[A4] In some embodiments, the display device of any of [A1] through [A3] is a television.

[A5] In some embodiments, the visual content data of any of [A1] through [A4] is paginated.

[A6] In some embodiments, the focusable element of any of [A1] through [A5] is an interactive element.

[A7] In some embodiments, the method of any of [A1] through [A6] includes indicating a scroll element while scrolling the visual content.

[A8] In some embodiments, indicating the scroll element of [A7] includes indicating the scroll element with the visual indicator.

[A9] In some embodiments, the visual indicator of any of [A1] through [A8] is a border visual indicator.

[A10] In some embodiments, the visual indicator of any of [A1] through [A8] is a highlighting visual indicator.

[A11] In some embodiments, the visual indicator of any of [A1] through [A8] is a movement visual indicator.

[A12] In some embodiments, the method of any of [A1] through [A11] includes scaling the focusable element based at least partially on a dimension of the viewport.

[A13] In some embodiments, the method of any of [A1] through [A12] includes, upon beginning scrolling, moving the visual indicator between the focusable element and a portion of a scroll bar.

[A14] In some embodiments, identifying at least one focusable element of any of [A1] through [A13] includes parsing the visual content data and identifying an element type of one or more elements of the visual content data.

[B1] In some embodiments, a system for providing visual content to a user includes a computing device that includes a communication device, a processor, and a hardware storage device. The communication device is configured to receive user inputs. The processor is in data communication with the communication device, and the hardware storage device is in data communication with the processor. The hardware storage device has instructions stored thereon that, when executed by the processor, cause the computing device to establish an interface template including a viewport; obtain visual content data; identify at least one focusable element in the visual content data; present a first portion of visual content in the viewport on a display device, wherein the visual content is based at least partially on the visual content data; indicate a first focusable element in the viewport with a visual indicator; and responsive to a user input, scroll the visual content in the viewport when a second focusable element of the visual content is not present in the viewport in a navigation direction of the user input.

[B2] In some embodiments, the computing device of [B1] is a video game console.

[B3] In some embodiments, the system of [B1] or [B2] includes a user input device wherein the user input device is a video game controller.

[B4] In some embodiments, the computing device of any of [B1] through [B3] further includes the display device.

[C1] In some embodiments, a method of navigating visual content includes, at a computing device, establishing an interface template including a viewport; obtaining visual content data; identifying at least one focusable element in the visual content data; presenting a first portion of visual content in the viewport of a user interface based at least partially on the interface template on a display device, wherein the visual content is based at least partially on the visual content data; indicating a first focusable element in the viewport with a visual indicator; responsive to a user input, scrolling the visual content in the viewport when at least one focusable element of the visual content is not present in the viewport in a navigation direction; and upon beginning scrolling, indicating a scroll element on a scroll bar.

[C2] In some embodiments, indicating the scroll element of [C1] includes using a same visual indicator as the first focusable element.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the scope of the present disclosure, and that various changes, substitutions, and alterations may be made to embodiments disclosed herein without departing from the scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method of navigating visual content comprising:
establishing an interface template including a viewport;
obtaining visual content data;
identifying at least a first focusable element and a second focusable element in the visual content data;
presenting a first portion of visual content in the viewport on a display device, wherein the visual content is based at least partially on the visual content data and the first portion includes the first focusable element and does not include the second focusable element;
indicating the first focusable element in the viewport with a visual indicator; and
responsive to a user input having a navigation direction, determining whether a second focusable element is present or not present in the viewport wherein the second focusable element is a next focusable element in the direction of the user input, wherein:

when the second focusable element of the visual content is not present in the viewport in a navigation direction of the user input scrolling the visual content in the viewport without moving the visual indicator from the first focusable element, and when at least a portion of the second focusable element is present in the viewport, moving the visual indicator to the second focusable element.

2. The method of claim 1, wherein the user input is a uniaxial directional user input.

3. The method of claim 1, wherein the display device is a television.

4. The method of claim 1, wherein the visual content data is paginated.

5. The method of claim 1, wherein at least one of the first focusable element and the second focusable element is an interactive element.

6. The method of claim 1, further comprising indicating a scroll element while scrolling the visual content.

7. The method of claim 6, wherein indicating a scroll element includes indicating the scroll element with the visual indicator.

8. The method of claim 1, wherein the visual indicator is a border visual indicator.

9. The method of claim 1, wherein the visual indicator is a highlighting visual indicator.

10. The method of claim 1, wherein the visual indicator is a movement visual indicator.

11. The method of claim 1, further comprising scaling at least one of the first focusable element and the second focusable element based at least partially on a dimension of the viewport.

12. The method of claim 1, further comprising, upon beginning scrolling, moving the visual indicator between the first focusable element and a portion of a scroll bar.

13. The method of claim 1, wherein identifying at least a first focusable element and a second focusable element includes parsing the visual content data and identifying an element type of one or more elements of the visual content data.

14. The method of claim 1, wherein moving the visual indicator to the second focusable element includes moving the visual indicator while at least one non-focusable element is present in the viewport.

15. A system for providing visual content to a user, the system comprising:
a computing device, the computing device including:
a communication device configured to receive user inputs,
a processor in data communication with the communication device, and
a hardware storage device in data communication with the processor, wherein the hardware storage device has instructions stored thereon that, when executed by the processor, cause the computing device to:
establish an interface template including a viewport;
obtain visual content data;
identify at least a first focusable element and a second focusable element in the visual content data;
present a first portion of visual content in the viewport on a display device, wherein the visual content is based at least partially on the visual content data and the first portion includes the first focusable element and does not include the second focusable element;
indicate a first focusable element in the viewport with a visual indicator; and
responsive to a user input having a navigation direction, determine whether a second focusable element is present or not present in the viewport wherein the second focusable element is a next focusable element in the direction of the user input, wherein:
when the second focusable element of the visual content is not present in the viewport in a navigation direction of the user input scrolling the visual content in the viewport without moving the visual indicator from the first focusable element, and
when at least a portion of the second focusable element is present in the viewport, moving the visual indicator to the second focusable element.

16. The system of claim 15, wherein the computing device is a video game console.

17. The system of claim 15, further comprising a user input device wherein the user input device is a video game controller.

18. The system of claim 15, wherein the computing device further includes the display device.

19. A method of navigating visual content comprising:
at a computing device:
establishing an interface template including a viewport;
obtaining visual content data;
identifying at least a first focusable element and a second focusable element in the visual content data;
presenting a first portion of visual content in the viewport of a user interface based at least partially on the interface template on a display device, wherein the visual content is based at least partially on the visual content data and the first portion includes the first focusable element and does not include the second focusable element;
indicating a first focusable element in the viewport with a visual indicator;
responsive to a user input having a navigation direction, determine whether a second focusable element is present or not present in the viewport wherein the second focusable element is a next focusable element in the direction of the user input, wherein:
when the second focusable element of the visual content is not present in the viewport in a navigation direction of the user input scrolling the visual content in the viewport without moving the visual indicator from the first focusable element, and
when at least a portion of the second focusable element is present in the viewport, moving the visual indicator to the second focusable element; and
upon beginning scrolling, indicating a scroll element on a scroll bar.

20. The method of claim 19, wherein indicating the scroll element includes using a same visual indicator as the first focusable element.

* * * * *